United States Patent [19]

Kingston

[11] 4,315,617
[45] Feb. 16, 1982

[54] LINE HAULERS

[76] Inventor: William Kingston, 49 Sandymount Ave., Dublin 4, Ireland

[21] Appl. No.: 912,437

[22] Filed: Jun. 5, 1978

Related U.S. Application Data

[63] Continuation-in-part of Ser. No. 779,543, Mar. 21, 1977, abandoned, which is a continuation-in-part of Ser. No. 659,229, Feb. 19, 1976, abandoned.

[30] Foreign Application Priority Data

Feb. 20, 1975 [GB] United Kingdom .............. 07096/75
Jun. 6, 1975 [GB] United Kingdom .............. 24504/75

[51] Int. Cl.³ ............................................. A01K 73/06
[52] U.S. Cl. .................................... 254/371; 254/374
[58] Field of Search ............... 254/190 R, 173 R, 174, 254/137, 175.7, 175.5, 138, 191, 371, 374; 74/230.24, 242.6; 114/253, 254; 226/176

[56] References Cited

U.S. PATENT DOCUMENTS

| 2,516,969 | 8/1950 | Fettig | 254/191 |
| 3,034,767 | 5/1962 | Gordon | 254/138 |
| 3,446,484 | 5/1969 | Walsh et al. | 254/190 R |
| 3,776,516 | 12/1973 | Daniel | 254/190 R |
| 3,809,369 | 5/1974 | Elsing | 254/173 R |

FOREIGN PATENT DOCUMENTS 1756076 3/1968 Fed. Rep. of Germany ...... 254/174

Primary Examiner—Robert J. Spar
Assistant Examiner—Kenneth Noland

[57] ABSTRACT

In a powered V-sheave hauling system, purposively spaced enlargements on the line permit automatic disengagement of line and sheave when any desired point on the line reaches the sheave. The line is then held from running backwards under its load. The invention is particularly directed towards the avoidance of stresses or damage when a load has been fully pulled in.

4 Claims, 4 Drawing Figures

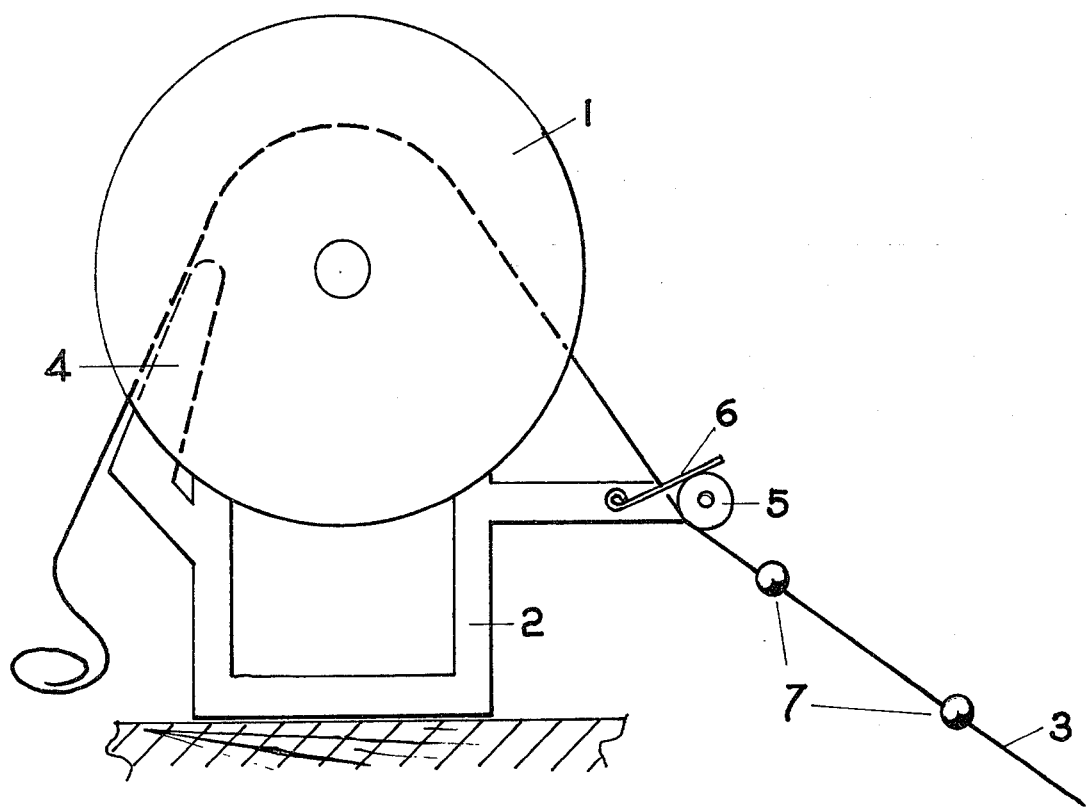
Fig-1-
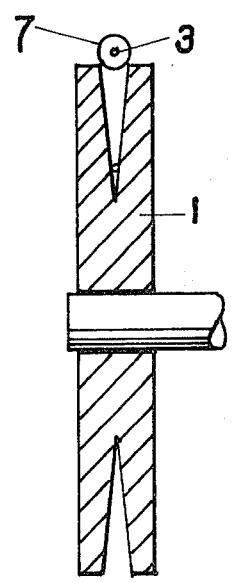
Fig-2-

LINE HAULERS

CROSS-REFERENCE TO RELATED APPLICATION

This application is a continuation-in-part of my pending Application Ser. No. 779,543, filed Mar. 21, 1977 now abandoned, which is a continuation-in-part of my first earlier filed Application Ser. No. 659,229, filed Feb. 19, 1976, now abandoned.

BACKGROUND OF THE INVENTION

1. Field of the Invention

V-sheave hauling, in which each part of a line successively is tractively gripped between the sheave inner surfaces and carried through part of a revolution of the sheave until it is stripped from the sheave V-groove by a line extractor which fits into the groove, is well known. This invention adds automatic ontrol means to this type of hauler.

U.S. Pat. No. 3,809,369 to Elsing discloses a mechanism for disconnecting a line and a sheave when a skier is brought into contact with the mechanism. U.S. Pat. No. 3,446,484 to Walsh et. al. discloses a means of cutting a line to prevent a load on it from being brought into contact with the hauling mechanism.

SUMMARY OF THE INVVENTION

This invention provides for specific points on the line to be designated as "permanent disconnection points". When one of these points reaches the sheave, the mechanism of the invention automatically separates line and sheave, so that pull on the line from the sheave ceases. Designation of these "permanent disconnection points" is by permanent attachments to the line at these points. After disconnection, the line is then independently held from moving backwards under its load. In both these ways, the invention differs from the prior art as disclosed by Elsing, any point of whose line can become disconnected from the sheave, whose line has no disconnection points that are permanent, that is, the same every time the line is used, and who discloses no means of holding the line against being pulled backwards by its load, after disconnection from the sheave.

BRIEF DESCRIPTION OF THE DRAWINGS

In the accompanying Drawing,

FIG. 1 is a side elevation of the preferred embodiment,

FIG. 2 is a section of the sheave only,

DESCRIPTION OF THE PREFERRED EMBODIMENT

Figure 3:
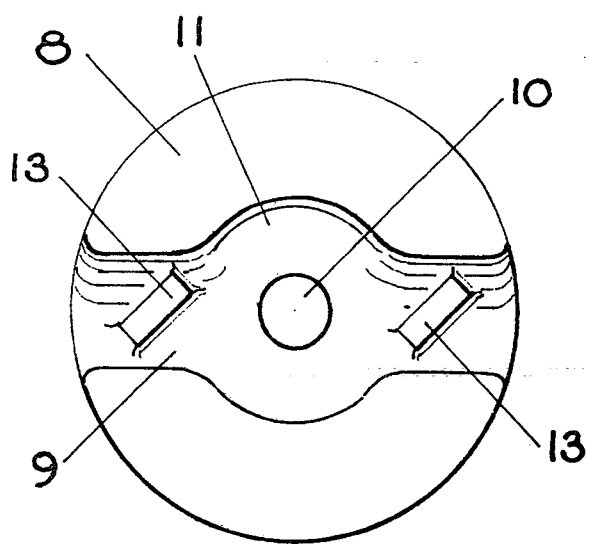
FIG. 3 is a plan view of one part of a two-part rope stop.
Figure 4:
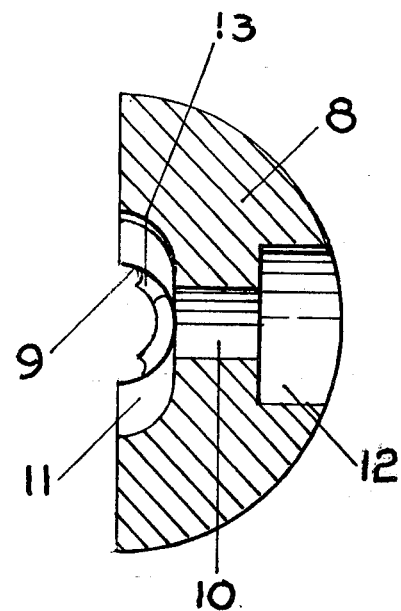
FIG. 4 is a section of the same part.

With reference to the FIGS., 1 is a powered V-sheave, 2 the frame on which it is mounted, 3 is the line, with its path around the sheave axis shown by the dotted line, 4 the line extractor which prises the line from the grip of the V-surfaces of the sheave 5, a roller to guide the line into the sheave, and 6 a spring-loaded gate, biassed against roller 5, in the direction of the incoming line. 7 indicates as series of enlargements on the line that are too big to fit into the V of the sheave. There are typically 3 of these, set at approximately a sheave radius apart on the line. Gate 6 has a notch in it, through which line 3 can readily pass, but which will not permit the passage of enlargements 7. In FIGS. 3 and 4, 8 is a (typically hemi-spherical) part of a two-part rope stop. The rope lies in groove 9 of each of the two parts 8, which are clamped together around the rope by a screw which passes through hole 10 of each part, and the rope. 11 indicates that groove 9 is opened out around hole 10 to accept the distortion of the rope by its penetration by the clamping screw. Each outer end of hole 10 is counterbored at 12 for the screw head and nut. Lugs 13, 13, on the inside of groove 9, fit into the lay of the rope, and assist in fixing the stop to the rope.

In operation, enlargements 7 are on the line at the point where it is desired to disconnect line and sheave, on this point arriving at the sheave. When enlargements 7 reach gate 6, they pass it by turning it aside against the force of the spring which biasses it against roller 5. As they are too big to enter the V of the sheave, they remain on its circumference, taking the nearby section of the line with them. FIG. 2 shows in dotted outline the normal position of the line in the V, and how the line is lifted outwards when a section carrying an enlargement reaches the sheave. The reason why enlargements 7 are typically a sheave radius apart, is that this distance ensures that no section of the line between any two enlargements is capable of being gripped in the V of the sheave when the line is under tension. When enough enlargements have been pulled on to the circumference of the sheave, there no longer is any line in tractive contact with the V surfaces, nor is any new section of line being brought into contact with them. Consequently, the line has been rendered free of the sheave. It then naturally tends to run backwards under the force of its load, but this causes the rearmost of the enlargements 7 to engage the notch in gate 6. As it is unable to pass this, the line is then held by it, independently of the sheave. The part of the line which carries the enlargements will either be cast aside from the sheave, or the enlargements will ride easily on the circumference of the sheave as this continues to revolve.

It will be evident that other methods of realizing this invention are possible. It will also be evident that the enlargements attached to the line could be replaced by suitably-sized knots. Gate 6 could be replaced by a cam-cleat arrangement.

I claim:

1. Powered line hauling means of the type wherein a line is pulled by frictional contact between rotatable V-groove surfaces, incorporating means for controlling the traction on said line, limited to automatic non-destructive means for preventing a length of said line from entering into said fractional contact, so as to break all tractive contact between said line and said surfaces, said contact-breaking means comprising a plurality of elements in sequence on said line, each of which renders said line too thick to enter into tractive contact with said V-groove surfaces, the distance between any pair of said elements being such as also to prevent any intermediate section of said line from entering into tractive contact with said groove surfaces, the number of said pairs of elements on said line being so determined that when the line immediately ahead of the leading element is at the normal point of exit from and the intermediate elements are disposed peripherally on, said hauling means, the line immediately behind the rearmost element is not in tractive contact with said hauling means.

2. Line hauling means as in claim 1, additionally provided with means for preventing said line from moving in the reverse direction under the force of its load, to its direction when being hauled, when said tractive contact is broken.

3. Line hauling means as in claims 1 or 2, wherein the element of said contact-breaking means comprises a rope stop in two mating parts, and means for clamping said parts together around a rope.

4. Line hauling means as in claim 3, wherein said clamping means penetrates said rope.

* * * * *